United States Patent
Chen et al.

(10) Patent No.: US 8,515,793 B2
(45) Date of Patent: Aug. 20, 2013

(54) VIRTUAL PRODUCTION CONTROL SYSTEM AND METHOD AND COMPUTER PROGRAM PRODUCT THEREOF

(75) Inventors: Ying-Liang Chen, Guiren Township, Tainan County (TW); Haw-Ching Yang, Tainan (TW); Fan-Tien Cheng, Tainan (TW)

(73) Assignee: National Cheng Kung University, Tainan (TW)

(*) Notice: Subject to any disclaimer, the term of this patent is extended or adjusted under 35 U.S.C. 154(b) by 643 days.

(21) Appl. No.: 12/724,553

(22) Filed: Mar. 16, 2010

(65) Prior Publication Data
US 2011/0040596 A1 Feb. 17, 2011

(30) Foreign Application Priority Data
Aug. 11, 2009 (TW) .............................. 98127013 A

(51) Int. Cl.
*G06Q 10/00* (2012.01)
(52) U.S. Cl.
USPC ........ 705/7.11; 705/7.12; 705/7.13; 705/7.22
(58) Field of Classification Search
USPC ........ 705/7.11–7.42; 700/40–117; 706/1–62
See application file for complete search history.

(56) References Cited

U.S. PATENT DOCUMENTS

| | | | | |
|---|---|---|---|---|
| 4,744,028 A * | 5/1988 | Karmarkar | ................. | 705/7.22 |
| 5,093,794 A * | 3/1992 | Howie et al. | ................. | 700/100 |
| 5,148,365 A * | 9/1992 | Dembo | ................. | 705/36 R |
| 5,231,567 A * | 7/1993 | Matoba et al. | ................. | 700/100 |
| 5,257,363 A * | 10/1993 | Shapiro et al. | ................. | 703/13 |
| 5,369,570 A * | 11/1994 | Parad | ................. | 705/7.13 |
| 5,555,179 A * | 9/1996 | Koyama et al. | ................. | 700/95 |
| 5,586,021 A * | 12/1996 | Fargher et al. | ................. | 700/100 |
| 5,596,502 A * | 1/1997 | Koski et al. | ................. | 700/95 |
| 5,787,000 A * | 7/1998 | Lilly et al. | ................. | 700/95 |
| 5,787,283 A * | 7/1998 | Chin et al. | ................. | 717/101 |
| 5,815,638 A * | 9/1998 | Lenz et al. | ................. | 706/15 |
| 5,826,040 A * | 10/1998 | Fargher et al. | ................. | 705/7.24 |
| 5,971,585 A * | 10/1999 | Dangat et al. | ................. | 700/102 |
| 5,993,041 A * | 11/1999 | Toba | ................. | 700/99 |
| 6,032,125 A * | 2/2000 | Ando | ................. | 705/7.31 |
| 6,349,237 B1 * | 2/2002 | Koren et al. | ................. | 700/96 |

(Continued)

OTHER PUBLICATIONS

"Predictive modeling for intelligent maintenance in complex semiconductor manufacturing processes"; Liu, Yang; ProQuest Dissertations and Theses; 2008; ProQuest Dissertations & Theses (PQDT).*

(Continued)

*Primary Examiner* — Alan S Miller
(74) *Attorney, Agent, or Firm* — McClure, Qualey & Rodack, LLP

(57) ABSTRACT

A virtual production control system (VPCS), and a virtual production control method and a computer program product thereof are provided. At first, the VPCS processes historical work-in-process (WIP) information and a current shipping plan sent from a supplier side, thereby obtaining a plurality of sets of WIP input/output historical data and a goods output schedule. Then, the VPCS performs an integer programming (IP) method to find the latest output schedule in accordance to the current shipping plan; uses a genetic algorithm (GA) to fit the historical distributed-parameters; adopts a neural network (NN) method to predict the future distributed-parameters of production; and finally utilizes a Petri Nets to simulate and obtain a latest feasible input schedule and a latest feasible output schedule.

10 Claims, 6 Drawing Sheets

(56) References Cited

U.S. PATENT DOCUMENTS

| | | | |
|---|---|---|---|
| 6,463,345 B1* | 10/2002 | Peachey-Kountz et al. | 700/99 |
| 6,611,726 B1* | 8/2003 | Crosswhite | 700/99 |
| 6,718,220 B2* | 4/2004 | Chen | 700/108 |
| 6,731,999 B1* | 5/2004 | Yang et al. | 700/102 |
| 6,788,985 B2 | 9/2004 | Mitsutake et al. | |
| 6,889,178 B1* | 5/2005 | Chacon | 703/6 |
| 6,970,841 B1* | 11/2005 | Cheng et al. | 705/28 |
| 7,020,594 B1* | 3/2006 | Chacon | 703/6 |
| 7,174,230 B2* | 2/2007 | Arackaparambil et al. | 700/96 |
| 7,289,867 B1* | 10/2007 | Markle et al. | 700/121 |
| 7,406,358 B2* | 7/2008 | Preiss | 700/99 |
| 7,499,766 B2* | 3/2009 | Knight et al. | 700/107 |
| 7,558,638 B2* | 7/2009 | Chang et al. | 700/97 |
| 7,610,212 B2* | 10/2009 | Klett et al. | 705/7.12 |
| 7,668,761 B2* | 2/2010 | Jenkins et al. | 705/28 |
| 7,676,293 B2* | 3/2010 | Yaji et al. | 700/100 |
| 7,822,630 B1* | 10/2010 | Smyth et al. | 705/7.31 |
| 8,069,122 B2* | 11/2011 | George | 705/400 |
| 2001/0051886 A1* | 12/2001 | Mitsutake et al. | 705/7 |
| 2002/0087227 A1* | 7/2002 | Tozawa et al. | 700/95 |
| 2002/0156663 A1* | 10/2002 | Weber et al. | 705/7 |
| 2002/0178077 A1* | 11/2002 | Katz et al. | 705/26 |
| 2003/0100970 A1* | 5/2003 | Chen | 700/108 |
| 2003/0144974 A1* | 7/2003 | Chang et al. | 706/25 |
| 2005/0010492 A1* | 1/2005 | Mitsutake et al. | 705/26 |
| 2005/0234575 A1* | 10/2005 | Wu et al. | 700/97 |
| 2005/0234579 A1* | 10/2005 | Asmundsson et al. | 700/102 |
| 2006/0010017 A1* | 1/2006 | Hase et al. | 705/7 |
| 2006/0235557 A1* | 10/2006 | Knight et al. | 700/103 |
| 2006/0250248 A1* | 11/2006 | Tu et al. | 340/572.4 |
| 2006/0282346 A1* | 12/2006 | Kernodle et al. | 705/28 |
| 2007/0168067 A1* | 7/2007 | Yaji et al. | 700/100 |
| 2008/0095196 A1* | 4/2008 | Weatherhead et al. | 370/503 |
| 2010/0138023 A1* | 6/2010 | Yaji et al. | 700/100 |
| 2010/0185311 A1* | 7/2010 | Hsieh et al. | 700/99 |

OTHER PUBLICATIONS

"Hardware-based Parallel Simulation of Flexible Manufacturing Systems"; Xu, Dong; Jul. 16, 2001; Blacksburg, Virginia; UMI No. 3073136.*

"Logility Announces Next Generation Supply Chain Planning Capabilities; New Modules Will Optimize Sourcing, Deployment and Profitability" PR Newswire, p. 311ATW017, Mar. 11, 1998.*

"Guidelines for selection of manufacturing simulation software"; Hlupic, Vlatka; Paul, Ray J.; IIE Transactions, 31, 1, 21; Jan. 1999; ISSN: 0740-817X.*

"The impact of ERP systems on firm and business process performance"; Wieder, Bernhard; Booth, Peter; Matolcsy, Zoltan P; Ossimitz, Maria-Luise; Journal of Enterprise Information Management ; pp. 13-29; 2006; ISSN: 1741-0398.*

"Models and Algorithms for Operations Scheduling Problems With Resource Flexibility and Schedule Disruptions"; Yang, Bibo; University of Florida, 2004; UMI No. 3146276.*

"Reconfiguring process plans: A mathematical programming approach"; Azab Ismail, Ahmed A.; ProQuest Dissertations and Theses; 2008; ProQuest Dissertations & Theses (PQDT).*

"Simulation Based Finite Capacity Scheduling System"; Jarrahzadeh, Ali; UMI No. 3315466, 2008.*

"Virtual Production Control System", Haw-Ching Yang, Ying-Liang Chen, Min-Hsiung Hung, and Fan-Tien Cheng; 6th annual IEEE Conference on Automation Science and Engineering; Marriott Eaton Centre Hotel; Toronto, Ontario, Canada, Aug. 21-24, 2010.*

"Virtual Production Lines Design for Back-End Semiconductor Manufacturing Systems"; Ying Tang, MengChu Zhou, and Robin G. Qiu; IEEE Transactions on Semiconductor Manufacturing, vol. 16, No. 3, Aug. 2003.*

* cited by examiner

VIRTUAL PRODUCTION CONTROL SYSTEM AND METHOD AND COMPUTER PROGRAM PRODUCT THEREOF

RELATED APPLICATIONS

This application claims priority to Taiwan Application Serial Number 98127013, filed Aug. 11, 2009, which is herein incorporated by reference.

BACKGROUND

1. Field of Invention

The present invention relates to a production control system and a production control method. More particularly, the present invention relates to a virtual production control system (VPCS), a virtual production control method and a computer program product performing the virtual production control method.

2. Description of Related Art

Under intense global market competition, supply chain management is developed to link the upstream and downstream flows of products, services, and information across businesses to integrate supply and demand. However, supply chains are typically subject to a bullwhip effect, which is caused by cascaded safety stocks for demand forecasts. Notably, the effect spreads to all chain manufacturers when the forecasts are uncertain and time-dependent. Once customer demands are changed promptly, the orders between a manufacturer side and supplier side will be increased or cancelled, thus easily causing the effects of enlarging or shrinking the demands so as to result in the problems of overstocking or understocking. To reduce the bullwhip effect on inventory, a vendor managed inventory (VMI) management model is adopted, wherein the manufacturer shares its material forecast with its supplier and authorizes the supplier to manage and handle the manufacturer side's inventory. The manufacturer shares its internal demand information (material forecast) with the supplier, and the supplier adopts the demand information into its inventory plan so as to determine how many products should be supplied to the manufacturer, thus lowering the bullwhip effect for the overall supply chain. By adopting the VMI management model, the forecast and authorization capabilities may enable the supplier side to produce and delivery material on time and to maintain an agreed inventory of material on the manufacturer side.

The material shortage on the manufacturer side is reduced when the VMI model is used, but the inventory problem is deferred to the supplier side under the unequal relationship with the manufacturer side. Since the manufacturer typically assumes that its supplier owns unlimited capacity to response to the arbitrary material demand changes, which could be caused by factors such as market variation, forecast error, and production variation. To adapt to and tackle these demand changes, the supplier side has to suffer high material inventory for buffering the demand changes using the VMI model. Therefore, the bullwhip effect still exists on the supplier side.

One of the critical factors for the success of supply chain management resides in reality and precision of information sharing, wherein reality refers to the sharing of production progress of the supplier with the manufacturer unmodified, while precision represents the shared information with sufficient time resolution for estimating the material production progress. For instance, in the semiconductor industry, RosettaNet is a popular standard for real and precise WIP information exchanging.

The supplier side's bullwhip effect mainly is resulted from forecast errors and production variations, wherein both factors can be decreased if the shared information, i.e. work in process (WIP) information, is completeness and precision. Additionally, a virtual factory was proposed to serve customers with the corresponding WIP information by demands according to the production estimations in a virtual factory. By using the virtual factory, a customer can ensure its material demand by checking the supplier side's production progress. However, since the virtual factory is located on the supplier side, the supplier side dominates the WIP information which could be modified by the supplier for business concerns. Since the WIP information obtained from the supplier is not sufficient for the manufacturer to change production capacity and material preparation at the supplier side in time, wherein the change of production capacity and material preparation may allow the manufacturer side to response to the possible delay of material delivery, thereby resolving the problems in time and reducing the impact of short-term production fluctuation. It is obvious that modified and inaccurate WIP information eventually induces planning losses and increases production fluctuations on the manufacturer side.

Except for acquiring WIP information, some of suppliers also apply the WIP information to predict their production progress, and to locate their production risks, in which the production parameters from the WIP information are identified to be simulated or programmed according to output schedules. If the production parameters are identified from the modified WIP information, the parameters are definitely fail to support the supplier to estimate and evaluate its production, not to mention the manufacturer needs. Therefore, if the production parameters such as capacity can be identified with the real and precise supplier side's WIP information, and the manufacturer side qualifies the production parameters and brings them into the following demand changes, then the corresponding forecast error and production variation can be decreased, such that the overall inventory in a supply chain can effectively reduced.

Further, a method for making a production control plan to predict production in time beforehand, can only be applied inside a factory at the supplier side, and is described as follows. The factory directly retrieves process or production parameter data from, for example, an internal manufacture system, and then uses a simulation or mathematically planning method to generate a short-term production scheduling plan for the factory itself, thereby preventing production delay and ensuing the customer order-fill rate, thus achieving the objective of short-term production control. Generally speaking, the aforementioned process or production parameter data cannot be directly applied at the manufacturer side to control the supplier side's production, mainly due to business concerns, it is difficult or even impossible for the manufacturer to collect real production situations from the supplier side. Even if the supplier were willing to provide the unmodified production information, the manufacturer also would face the problem of huge data burden. Hence, a typical production control method generally used by a factory to resolve production fluctuation is not suitable in resolving the production fluctuation problem between a manufacturer side and a supplier side in a supply chain.

SUMMARY

In order to effectively resolve the high inventory problem of the VMI model by using WIP information at a supplier side, the embodiments of the present invention provide a production control system, referred to as a virtual production control system (VPCS), installed at the manufacturer side. In comparison with the current industrial situation at which a WIP information system is built at the supplier side, the embodiments of the present invention can advantageously allow a manufacturer to convert to an active WIP management from a passive WIP management. Besides assisting the manufacturer to have real WIP information in hand, the VPCS also can predict the production risks, i.e. bottleneck, at the supplier side and support the manufacturer to negotiate and avoid the risks with the supplier in time.

The VPCS extracts process capacity parameters from the updated WIP information periodically provided from a supplier, and predicts a future output schedule and potential production risks after loading the production capacity parameters thereinto. Through the VPCS, the manufacturer can issue possible production risks occurring at the supplier side early, so as to achieve the object of indirect control of the supplier production, thus reducing the short-term production fluctuation at the supplier side, and lowering inventory cost.

Typically, when a customer modifies its order to follow market changes, the manufacturer also needs to adjust its command (the material requirements plan) provided to its supplier. Since the orders are arbitrarily modified, the supplier is suffered more production fluctuations from the order changes than the short-term production fluctuation from the supplier itself. Since the VPCS is built at the manufacturer side for controlling the supplier short-term production, the manufacturer not only can evaluate the production variance inside the supplier side via the VPCS, but also can apply the evaluation to adjust a material requirements plan which later will be sent to the supplier. Therefore, the VPCS can be used to promptly predict the production risks and solutions for the supplier, so that the manufacturer may be able to coordinate with the supplier rapidly and efficiently. After coordination, the supplier may change its production pace and then subsequently smooth and reduce possible production risks or fluctuations from order changes. Thus, the VPCS can support production decision making among suppliers, manufacturers and customers in response to the variations of external markets and internal productions; and can consistently restrain the supplier from the production fluctuation problem, thereby enabling the supplier to ensure its high inventory turnover rate under a high order-fill rate.

One aspect of the present invention is to provide a virtual production control system (VPCS) and a virtual production control method and its computer program product for effectively using WIP information at the supplier side to resolve the problem of high inventory level used for maintaining a high order-fill rate.

According to aforementioned aspect, a VPCS located at a manufacturer side is provided. In one embodiment, the VPCS includes a data preprocessing module, a WIP monitoring module, and a production conjecture module. The data preprocessing module is used for processing a current shipping plan and a plurality of sets of historical input/output WIP data respectively belonging to a plurality of historical production cycles sent from a supplier side, thereby obtaining a plurality of historical input records and a plurality of historical output records belonging to the historical production cycles. The WIP monitoring module is used for performing an integer programming (IP) method based on the current shipping plan and the current WIP data, thereby finding the latest ideal input schedule and the latest ideal output schedule belonging to a next production cycle. The production conjecture module is used for simulating and obtaining the latest feasible input schedule and the latest feasible output schedule belonging to the next production cycle by using the historical input and output records, where the historical input and output records are used in a distributed-parameters estimation method, a neural network (NN) algorithm and a Petri Nets (PN) model to predict the next production cycle.

In another embodiment, the aforementioned data preprocessing module is used for analyzing an expected production capacity and a loss rate of the next production cycle based on the last production cycles.

In another embodiment, the aforementioned production conjecture module is used for generating an inventory profile in accordance with the expected production capacity, the loss rate, the latest feasible input schedule, and the latest feasible output schedule, where the inventory profile includes the estimated WIP quantity and status, and estimated inventory turnover rate and obsolete material.

In another embodiment, the aforementioned production conjecture module is used for generating a delivery profile in accordance with the expected production capacity, the loss rate, the latest feasible output schedule and the current shipping plan, the delivery profile including estimated production schedules, estimated order-fill rates, estimated delayed delivery quantities, delayed delivery reasons and production capacity bottlenecks.

In another embodiment, the aforementioned integer programming method maximizes overall order-fill rates to conjecture an ideal output schedule and an ideal input schedule, where the schedules are limited by an actual production capacity and a safe inventory strategy of the supplier side.

In another embodiment, the aforementioned production conjecture module includes a distributed-parameters estimation function, a distributed-parameters prediction function and a PN simulation function. The distributed-parameters estimation function is used for estimating a plurality of sets of historical input distributed-parameters data, a plurality of sets of historical output distributed-parameters data by using the historical input schedules and the historical output schedules in accordance with the distributed-parameters estimation method. The distributed-parameters prediction function is used for predicting a set of estimated production distributed-parameters of the next production cycle by using the neural network method. The PN simulation module is used for simulating the latest feasible input schedule and the latest feasible output schedule belonging to the next production cycle by using the latest ideal output schedule and the set of estimated production distributed-parameters belonging to the next production cycle in accordance with the Petri Nets.

In another embodiment, the aforementioned distributed-parameters estimation method includes a Kullback-Leibler Distance (KLD), a Kolmogorov-Smirnov test (KS-test) and a genetic algorithm. The KLD is used for determining a distance between two probabilistic models.

The KS-test is used for testing the maximum absolute error between a fitted probabilistic model and an expected probabilistic model. The genetic algorithm is used for finding an optimal probabilistic models set by combining the F-test and the KS-test.

In another embodiment, the aforementioned virtual production control system further includes a master data and a production type configuration. The master data is used for defining the sets of historical WIP information. The production type configuration can include an assembly type and a process type, wherein the data preprocessing module, the WIP monitoring module and the production conjecture module are adjusted in accordance with the production type configuration. The master data include a product configuration, a process configuration and corresponding tables. The product configuration is obtained from an enterprise resource planning (ERP) system for indicating structural relationships such as bills of material. The process configuration is obtained from the ERP system for indicating structural relationships between the processes and routings. The corresponding tables include a plurality of production classes classified by various production capacity groups, a corresponding table of process characteristics, and a corresponding table of stage names and relations within the processes.

In another embodiment, the VPCS is located at a manufacturer side, and the current shipping plan is confirm by the supplier in accordance with a material requirements plan provided by the manufacturer.

According to aforementioned aspect, a virtual production control method is further provided. In the virtual production control method, a step is first performed to process a current shipping plan and a plurality of sets of historical WIP information respectively belonging to a plurality of historical production cycles sent from a supplier side, thereby obtaining a plurality of historical input schedules and a plurality of historical output schedules belonging to the historical production cycles, an expected production capacity of a next production cycle following the historical production cycles, and loss rates of the last production cycle. Then, an integer programming method is performed by using the current shipping plan and the last WIP information, thereby deriving a latest ideal input schedule and a latest ideal output schedule belonging to the next production cycle. Thereafter, a step is performed to conjecture a plurality of sets of historical production distributed-parameters by using the historical inputs and outputs in accordance with the distributed-parameters estimation method. Then, a step is performed to predict a set of estimated input distributed-parameters, a set of estimated output distributed-parameters of the next production cycle by using the sets of historical input distributed-parameters, and the sets of historical output distributed-parameters in accordance with the neural network method. Thereafter, a step is performed to simulate and obtain the latest feasible input schedule and the latest feasible output schedule belonging to the next production cycle by using the latest ideal output schedule and the set of estimated production distributed-parameters belonging to the next production cycle in accordance with the Petri Nets.

According to aforementioned aspect, a computer program product disposed on a non-transitory tangible computer readable recording medium for virtual production control is provided. When the computer program product is executed, the aforementioned virtual production control method can be performed.

It can be known from the above embodiments that, the application of the present disclosure can effectively conjecture the delivery capability of the supplier side, thereby controlling the inventory level at the supplier side, thus ensuring the supplier side to achieve high order-fill rate and high inventory turnover rate.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
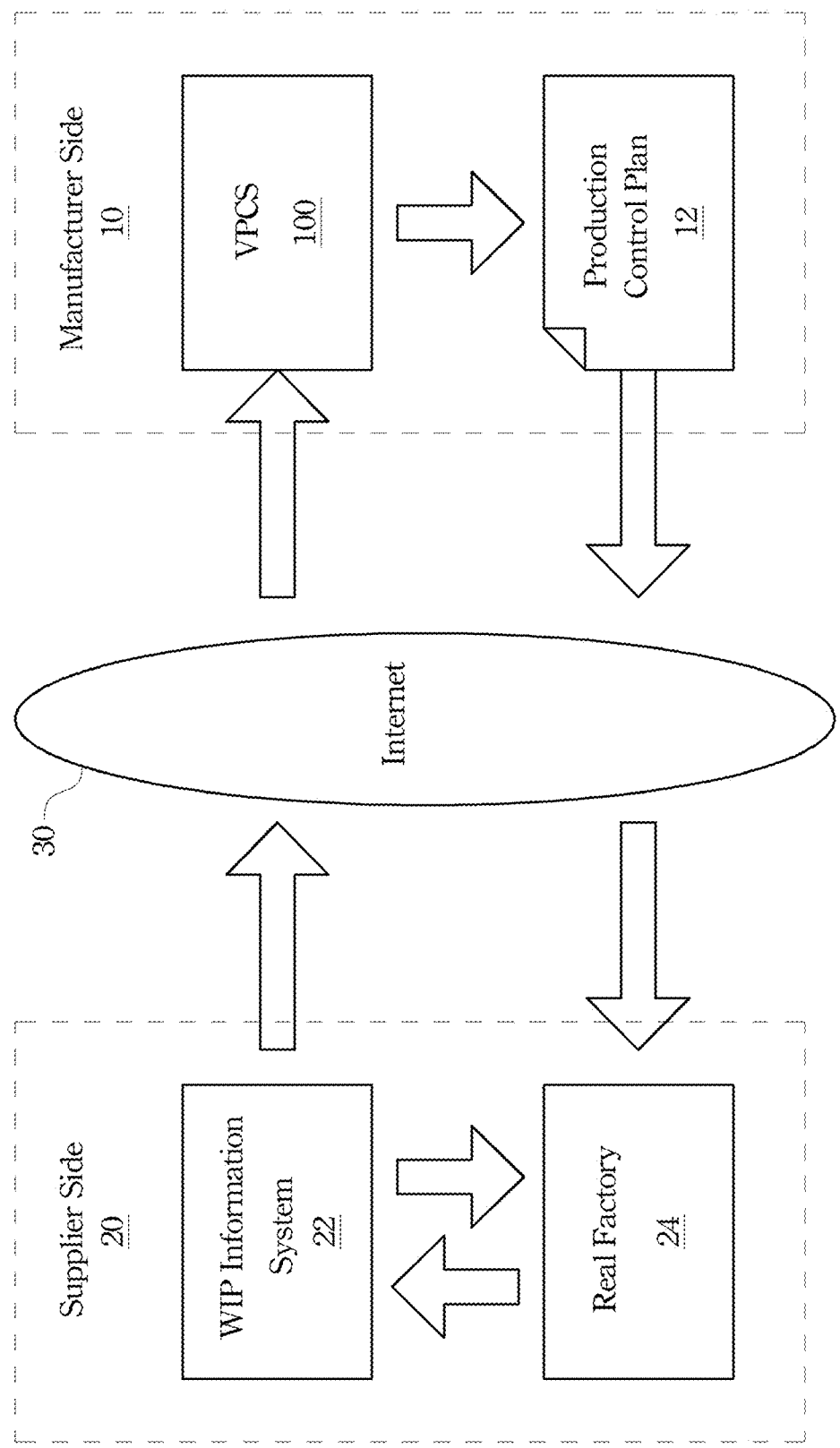
FIG. 1 is a schematic diagram showing an application structure of a virtual production control system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
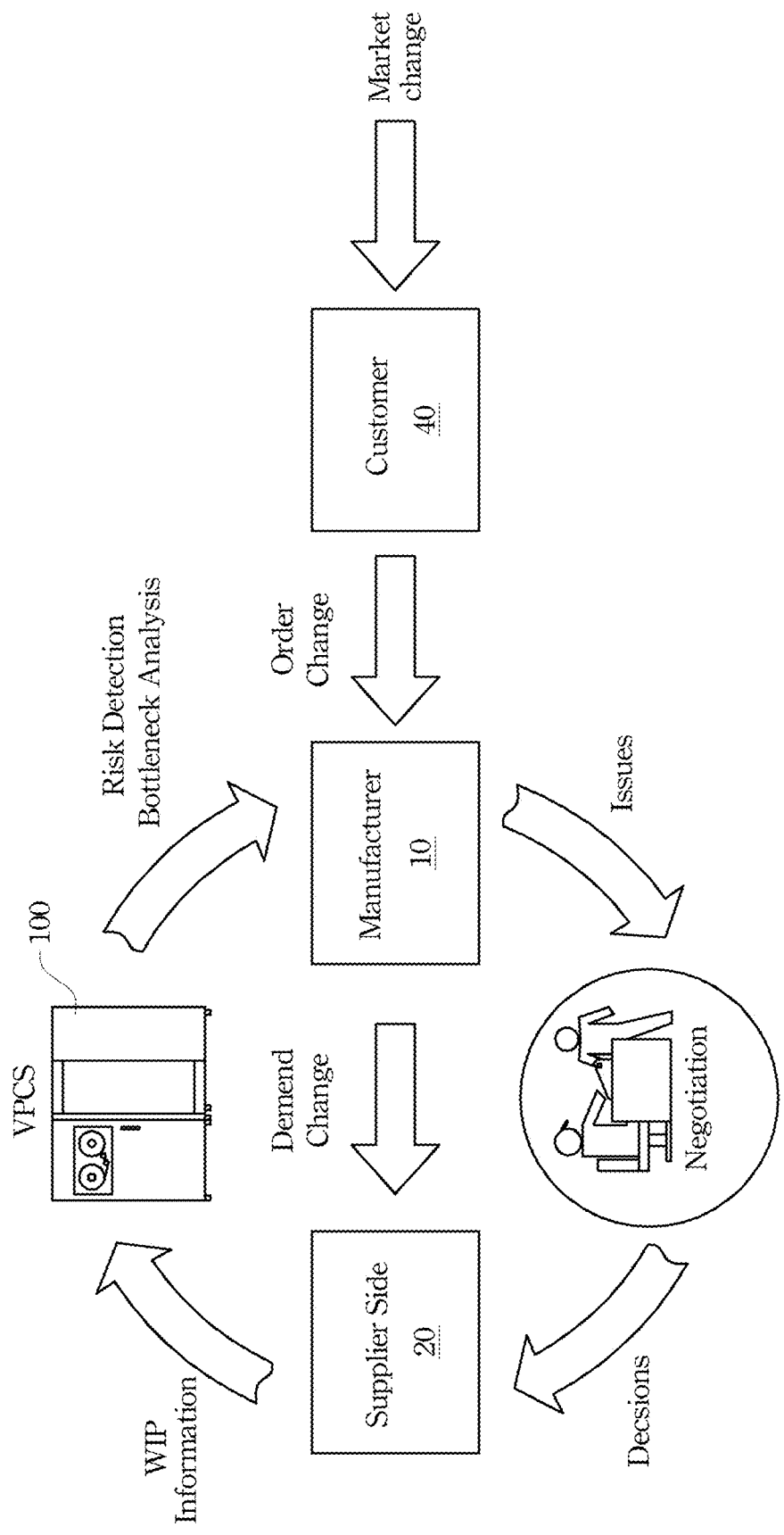
FIG. 2 is a schematic diagram showing a production control process of the virtual production control system according to the embodiment of the present invention.

Referring to FIG. 1, FIG. 1 is a schematic diagram showing an application structure of a virtual production control system according to an embodiment of the present invention, wherein a manufacturer side 10 conducts communication with a supplier side 20 through Internet 30. In order to effectively utilize the WIP information provided by a WIP information system 22 at the supplier side 20 to resolve the high inventory problem of the conventional VMI mode, the present embodiment installs a VPCS 100 at the manufacturer side 10, thereby enabling the manufacturer side 10 to convert to an active WIP management from a passive WIP management. Besides assisting the manufacturer side 10 to have accurate and objective WIP information in hand, the VPCS 100 can further predict the production risks at the supplier side 20 and provide reference information of production control plan 12 to a real factory 24 of the supplier side 20, so that production bottlenecks or delays can be identified as early as possible. In communication between the manufacturer side 10 and the supplier side 20, the VPCS 100 may adopt the RosettaNet protocol as the communication standard, for example, in which the material forecast demand, the shipping plan and WIP information are defined and complied with RosettaNet PIP 4A4, 4A5, and 7B1, respectively. The VPCS 100 may use a production planning integration server (PPIS) to serve as an information bridge between the manufacturer side 10 and the supplier side 20 based on the RosettaNet information framework. Referring to FIG. 2, FIG. 2 is a schematic diagram showing a production control process of the virtual production control system according to the embodiment of the present invention. When customer order changes, the VPCS 100 allows the manufacturer side 10 to evaluate the production issues such as production risks and capacity bottlenecks before the corresponding demand changes being released to the supplier side 20, wherein the VPCS 100 collects WIP information and detects the issues to negotiate with the supplier side 20. In this embodiment, at first, the VPCS 100 extracts production capacity parameters from the updated WIP information every time provided by the supplier side 20, and predicts a WIP future output schedule for detecting delayed products and analyzing production bottlenecks after loading the production capacity parameters thereinto. Hence, through the VPCS 100, the manufacturer side 10 will be able to find the possible production risks together with the supplier side 20 early and in time, so as to achieve the object of indirect production control of the supplier side 20, thus reducing the short-term production fluctuation at the supplier side 20, achieving the target of lowering inventory cost. The VPCS 100 of the present embodiment is preferably installed at the manufacturer side 10. However, in response to actual situations, the VPCS 100 also can be installed at the supplier side 20 or can be used from the supplier side 20.

Since the VPCS 100 is preferably built at the manufacturer side 10 for controlling the supplier side 20 the short-term production, the manufacturer side 10 not only can control the production pace inside the supplier side 20 via the VPCS 100, but also can rapidly evaluate its material forecast plan provided to the supplier side 20. As shown in FIG. 2, when a customer 40 adjusts its order in response to market changes, the manufacturer side 10 also needs to modify its demand (the material forecast plan) provided to the supplier side 20. In addition to the short-term production fluctuation inside the supplier side 20, if the demand also is modified, more production fluctuation will be caused at the supplier side 20. Since the VPCS 100 can be used to promptly predict the production risks and provide resolution measures to the manufacturer side 10, the manufacturer side 10 is able to conduct production coordination with the supplier side 20 rapidly and efficiently. After coordination, the supplier side 20 can re-adjust its production and reflects the related WIP subsequently to the VPCS 100 for smoothing possible production fluctuations. Thus, the VPCS 100 plays a role to support production decision making among the supplier side 20, the manufacturer side 10, and the client (customer) 40 in response to the variances of external markets and internal production; and can consistently monitor and improve the production fluctuation problem at the supplier side 20, thereby enabling the supplier side 20 to ensure its high inventory turnover rate under a high order-fill rate.

Figure 3:
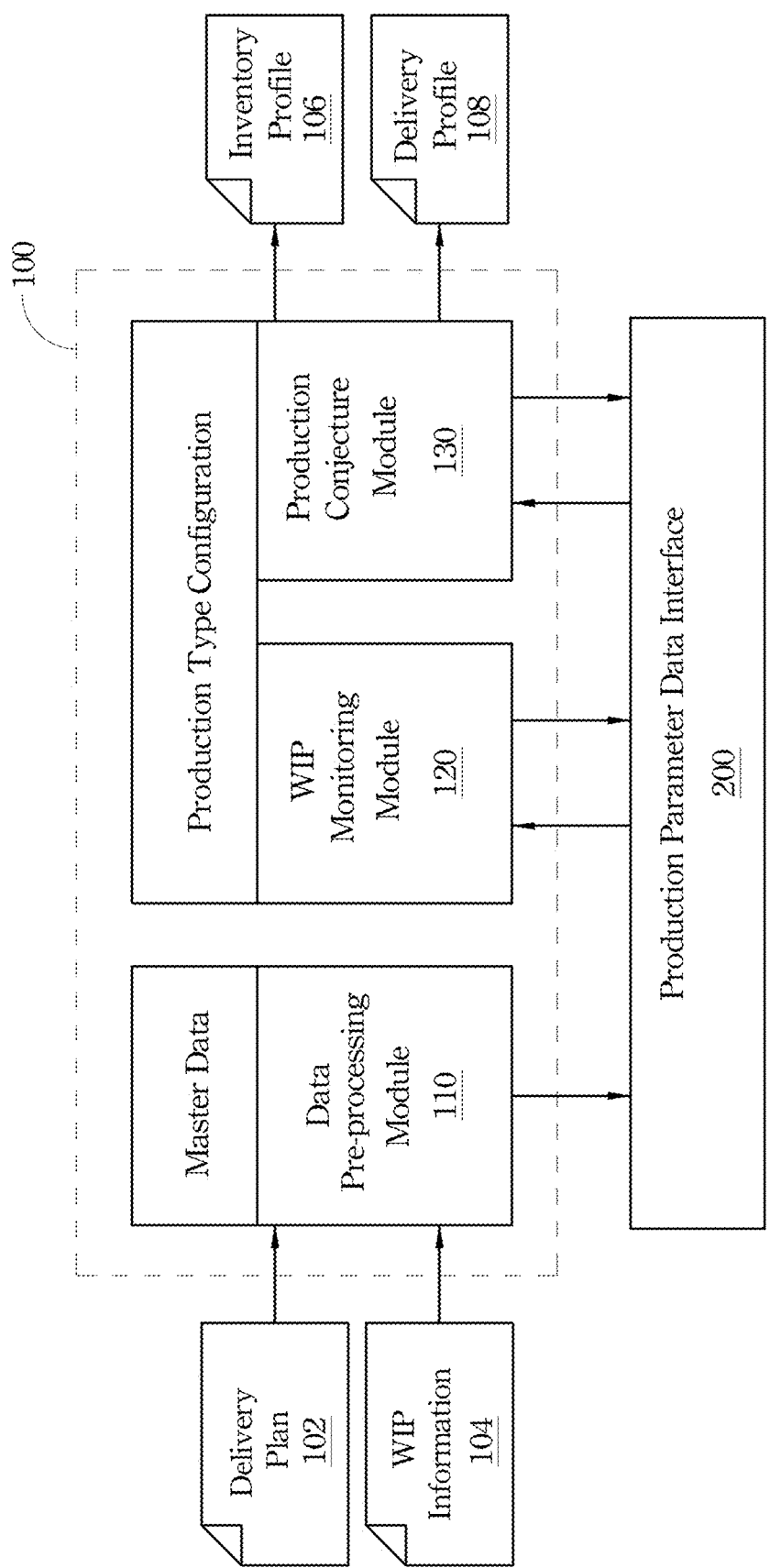
FIG. 3 is a schematic diagram showing the structure of a virtual production control system according to an embodiment of the present invention.

Referring to FIG. 2 and FIG. 3, FIG. 3 is a schematic diagram showing the structure of a virtual production control system according to an embodiment of the present invention. When receiving customer orders from the customer 40, the manufacturer side 10 usually changes the material demand sent to the supplier side 20 by a first time period. Within a second time period, the manufacturer side 10 will receive a shipping plan 102 from the supplier side 20 using the VPCS 100. Meanwhile, the VPCS 100 allows the manufacturer side 10 to collect WIP information 104 from the supplier side 20 to qualify the information for completeness by a third period. By locating the actual inventory from the qualified WIP information, the VPCS 100 then can verify and review the material demand plan before releasing it to the supplier side 20. The possibility of demand changes from supplier capacity can be reduced based on the verified demand. Moreover, using the VPCS 100, the manufacturer 10 can be assisted by addressing production issues, i.e. delivery risk and production bottleneck of the supplier side 20 to negotiate with the supplier side 20 for finding the issues' solutions in time. Consequently, with the shipping plan 102 and the WIP information 104, the VPCS 100, in which the variations of the outer market and inner production are monitored continually, supports the production decisions of the supplier side 20 for achieving a high inventory turn-over rate under a high order-fill rate condition.

The VPCS 100 includes a data preprocessing module 110, a WIP monitoring module 120, and a production conjecture module 130. The input data required by the VPCS 100 include the (current) shipping plan 102 and WIP information 104, and the output data from the VPCS 100 include an inventory profile 106 and a delivery profile 108. The output data from the aforementioned three modules will enter a production planning integration module (not shown) via a production parameter data interface 200 for analyzing abnormal data, inconsistent information, and lacked values. Thereafter, the production planning integration module will output the planning information including a data quality result, a WIP situation, an inventory profile, a delivery profile and an abnormality report for use in supporting the manufacturer side 10 to make decision in accordance with actual production situations.

As shown in FIG. 3, the VPCS 100 can be diffused to various industries by using a setup composed of a master data (not labeled) and a production type configuration (not labeled). By setting the master data and the production type configuration, the VPCS 100 can control the supplier sides of various production types, and thus can be applied on various industries. The master data include a product configuration, a process configuration and data corresponding tables. The data regarding the product configuration and the process configuration can be obtained from an ERP system. The product configuration indicates a structural relationships between usage quantities and part numbers of raw materials, semi-finished products and products; the process configuration indicates structural relationships between the part numbers and processes; and the data corresponding table includes a plurality of production classes classified by various production capacity groups, a corresponding table of process titles, and a corresponding table of stage names within the processes. The application of the production type configuration can allow the VPCS 100 to perform configuration setup based on different production types of the supplier sides, so as introduce the VPCS 100 into various types of industries, wherein the production type configuration includes an assembly type and a process type. With respect to the main material manufacturing processes at the manufacturer side, by setting the production type configuration, the WIP monitoring (the WIP monitoring module 120) and process simulation (the production conjecture module 130, i.e. a PN simulation module shown in FIG. 4 which will be explained in the below) can be adjusted in accordance with the definitions and processes of the respective supplier sides (regardless of the assembly type or the process type), thereby enabling the VPCS 100 to have diffusivity.

Hereinafter, the input data, the output results, and the respective modules of the VPCS 100 are explained.

Input Data

A. Shipping Plan:

When receiving a material forecast demand from the manufacturer side, the supplier side replies a (current) shipping plan 102 that includes shipping quantities and dates by products to the manufacturer within a time-constraint (the second time period) such as 24 hours. The (current) shipping plan 102 is an expected delivery schedule replied to the manufacturing side from the supplier side with a prerequisite period of time, after the supplier side receives the material forecast demand (order plan) from the manufacturer side. The shipping plan 102 includes delivery quantities and time of the respective material pieces.

B. WIP Information:

WIP information 104 is transaction-based or snapshot-based WIP information. After receiving a demand from the manufacturer side and replying the shipping plan 102, the supplier side is required to start providing the WIP information to the manufacturer side, wherein transactions and snapshots are triggered and recorded according to the transaction events by lot, e.g. move-in, move-out, and hold, in the WIP glossary defined by the manufacturer and the supplier. Because acquiring WIP information in VPCS is intended to analyze correctly the production behaviors and to locate the production risk, the glossary is defined in the linking of WIP in production stages, where the WIP information contains the material number, order number, process stage, product group, transaction event, transaction time, quantity, and WIP status. When a transaction event or time-triggered event of WIP belongs to an event protocol, the supplier side will automatically record the time and contents of the event, and send the event record regarding WIP changes to the manufacturer side at a predetermined time point. The manufacturer side has to discuss the contents of the WIP event protocols with the supplier side in advance, so as to define at what kinds of WIP change occurring the supplier side has to send the transaction data to the manufacturer side.

The purpose for the VPCS 100 to collect the WIP information 104 from the supplier side is to real-time analyze the production behaviors at the supplier side, so as to grasp the short-term production risks of the supplier side. Thus, the most importance of the contents of the WIP event protocols is to classify the production stages in the processes at the supplier side, and to define the classified production stages in the specification of electronic data exchange standard (such as PIP (Partner Interface Process) of RosettaNet standards). Then, the VPCS 100 can link the production stages of the respective process sections at upstream and downstream supplier sides via the WIP information 104, thereby using the production stages as the virtual production control stages of the VPCS 100. The contents of the WIP information 104 required by the VPCS 100 include: a final product number of WIP at the manufacture side; an order number of the manufacturer side issued to the supplier side; equipment classifications of the respective supplier sides grouped by the manufacturer side; the most update production status, causes and quantities of WIP and transaction events and time of WIP.

Data Preprocessing Module 110

The data preprocessing module 110 is mainly to perform a procedure for preprocessing the WIP information 104. Since the WIP information 104 are raw data of which the production information value needs further extracted. Through the data preprocessing procedure, the incorrect or poor quality data can be filtered out, and the valuable production parameters can be extracted, including: time distributions of production period, input, production halt; and data of production capacity conditions and production loss. The purpose of the data preprocessing module 110 is to first extract, convert, load, and save the collected WIP raw data for use in the subsequent WIP monitoring module 120 and production conjecture module 130.

Figure 4:
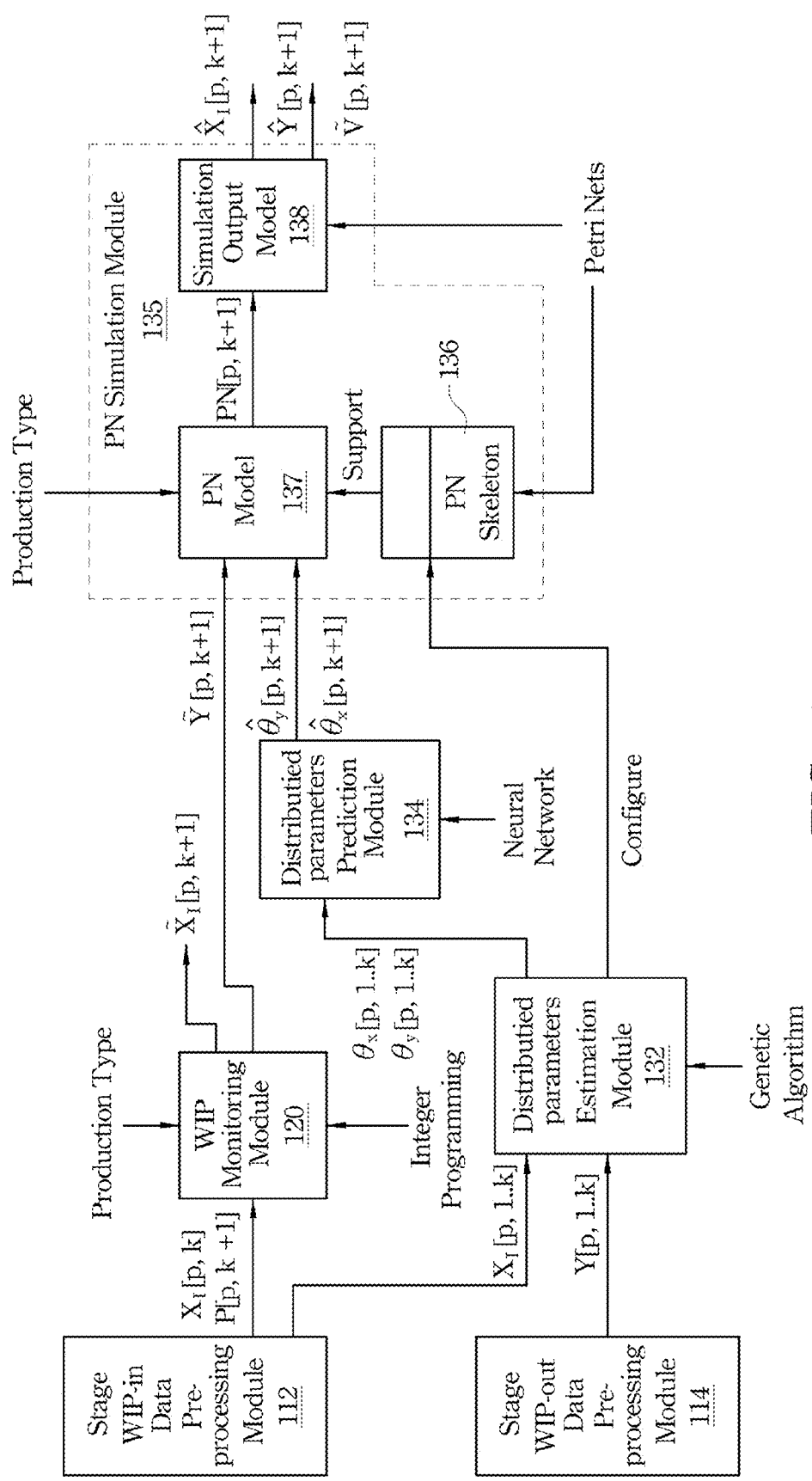
FIG. 4 is a schematic diagram used for explaining the virtual production control system and method of the embodiment of the present invention.

Referring to FIG. 3 and FIG. 4, FIG. 4 is a schematic diagram used for explaining the virtual production control system and method of the embodiment of the present invention.

The data preprocessing module 110 attempts to retrieve, transfer, and store the acquired raw WIP data into the qualified WIP information in preparation for the subsequent modules. The data preprocessing module 110 includes two modules: a stage WIP-in data preprocessing module 112 and a stage WIP-out data preprocessing module 114, wherein the stage WIP-in data pre-processing module 112 processes two data types: the WIP information WIP{X,Y} and the next period shipping plan P[p, k+1], where in WIP{X,Y} X and Y represents the inputs and outputs, respectively. The stage WIP-out data preprocessing module 114 processes quantity, production loss, and time of outputs. When abnormal or unreasonable data is embedded in the WIP information, such as missing WIP, earlier move-out time than move-in time, or extreme differences between input and output times, the stage WIP-out data preprocessing module 114 can identify the erroneous data for monitoring and fixing.

Since the shipping plan is the data related to the supplier side's planned production times and quantities of the respective products required by the manufacturer side. The manufacturer side provides or updates the shipping plan data to the supplier side in accordance with market demand changes via a data exchange scheme.

As shown in FIG. 4, the stage WIP-in data preprocessing module 112 is used to process a current shipping plan P[p, k+1], and a plurality of sets of historical WIP information respectively belonging to a plurality of production cycles [1 . . . k] in the past (i.e. historical production cycles [1 . . . k]), thereby obtaining a plurality of historical input schedules $X_I[p, 1 \ldots k]$ of the historical production cycles [1 . . . k] (wherein the subscript I stands for input). The stage WIP-out data pre-processing module 114 is used to process the sets of historical WIP information respectively belonging to the historical production cycles [1 . . . k], thereby obtaining a plurality of historical output schedules Y[p, 1 . . . k] of the historical production cycles [1 . . . k]. Further, the data preprocessing module 110 can further analyze and obtain an expected production capacity limit U[g, k+1] of a next production cycle k+1, an loss rate e[p, k] of the most recent historical production cycle k, and an inventory turnover rate r.

WIP Monitoring Module 120

The WIP monitoring module 120 locates the WIP-out boundaries by maximizing an order-fill rate (OFR) to predict the latest inputs and outputs of a shipping plan, wherein the inputs are dominated by the inventory turnover policy and the outputs are limited by the historical capability. The WIP monitoring module 120 adapts an integer programming method to find the OFR $\tilde{V}[p, k+1]$ (equation (1)), where p denotes the product ID, k is the current production cycle, and k+1 represents the next production cycle to be estimated. In this module, decision variables are the estimated number of input $\tilde{X}_I[p, k+1]$ and the estimated number of output $\tilde{Y}[p, k+1]$. In this module, the following three constraints are given in the integer programming relations: equation (2) shows that the accumulating output does not exceed the sum of the initial WIP $w_p^0$ and the input $\tilde{X}_I[p, k+1]$; equation (3) denotes that the output $\tilde{Y}[p, k+1]$ is bounded by the product capability $H_{g,k+1}$, where g is the product group; and, equation (4) shows that the estimated TOR should exceed the target TOR $R_{k+1}$, where TOR represents the sum of $\tilde{Y}[p, k+1]$ and an initial finished good $F_p^0$ over the sum of $\tilde{X}_I[p, k+1]$ and $w_p^0$, as shown in the following equations.

Objective:

$$\max \tilde{V}[p, k+1] \left( = \frac{\tilde{Y}[p, k+1] + F_p^0}{P[p, k+1]} \right) \quad (1)$$

Subject to:

$$(\tilde{X}[p, k+1] + W_p^0) \times e_{p,k} \geq \tilde{Y}[p, k+1] \quad (2)$$

$$\tilde{Y}[p, k+1] \leq H_{g,k+1} \quad (3)$$

-continued $$\frac{\tilde{Y}[p, k+1] + F_p^0}{\tilde{X}[p, k+1] + W_p^0} \le R_{k+1} \quad (4)$$

By using the integer programming, the estimated output $\tilde{Y}[p, k+1]$, i.e. the latest output time of the next production cycle k+1, can be determined as the simulation input in the subsequent module.

Through the conjecture of the integer programming, the expected input behaviors obtained thereby will be used as the basis for the subsequent system simulation.

As shown in FIG. 4, the WIP monitoring module 120 is used to performing the integer programming by using the current shipping plan P[p, k+1] and the historical input schedules $X_I[p, k]$ of the most recent historical production cycle k, thereby computing a latest ideal input schedule $\tilde{X}_I[p, k+1]$ and a latest ideal output schedule $\tilde{Y}[p, k+1]$ belonging to a next production cycle K+1.

Production Conjecture Module 130

From programming results, an estimated input $\tilde{X}_I[p, k+1]$ represents an estimated latest input time, which does not imply that cycle time differences exist for various products. It means that since a production needs times, a feasible input must be earlier than the corresponding $\tilde{X}_I[p, k+1]$ even with sufficient parts for production.

To identify feasible inputs and outputs schedules (yellow blocks in FIG. 2), the output estimation module first integrates inputs and corresponding outputs from periods 1 to k to find the process distributed parameters, which includes batching, inter-arrival time, and cycle time.

However, for available constrained resources collected data represent more than one activity; thus, a frequency histogram formed from historical data is difficult to fit in an identical distribution. This finding implies that different activities contribute various distributed families into a frequency histogram. A multimodal distributed identification method is needed to recognize different activities. For instance, although collected WIP information denoted as move-in and move-out time can be used to determine a cycle time, which is embedded with three production associated activities message transmission delay, material waiting time, and production processing time. These three activities contribute to the corresponding probabilities in a cycle-time frequency histogram; i.e., transmission delay represents inter- or intra-message communication time delays for production release and execution, waiting time is time spent waiting for a material or resource, and processing time is actual production time. For any production lot, cycle time of each lot is cascaded with the three activities, indicating that cycle time equals to sum of transmission delay, waiting time, and processing time.

The production conjecture module 130 is based on the historical capacity of process to conjecture a range of possible production capacity as the reference of the subsequent decisions. Since the integer programming used in the aforementioned WIP monitoring module 120 does not consider different production cycle features of the respective products. Therefore, even under the condition of sufficient material pieces, the input time of a product sill has to be move the required cycle days ahead, thereby meeting the expected production time. Hence, the purpose of the system simulation in the production conjecture module 130 is to further conjecture possible behaviors of actual production in accordance with the historical data, the current data and the concurrently conjectured data. As shown in FIG. 4, the production conjecture module 130 includes a distributed-parameters estimation module 132, a distributed-parameters prediction module 134 and a PN simulation module 135. The PN simulation module 135 includes a PN skeleton 136, a PN model 137 and a simulation output module 138. In system simulation, at first, the input data $X_I[p, 1 \ldots k]$ in a certain period of time (i.e. historical production cycles [1 . . . k]) are collected, and the corresponding output schedules Y[p, 1 . . . k] are also complied. Then, the distributed-parameters estimation method is used to obtain statistical distributions corresponding to process stages, the statistical distributions including lot quantities, arrival time intervals, split lot quantities and cycle times, and parameter prediction based on a neural network (NN) method is used together to estimate various parameter distributions of the next production cycle. After a PN process model is built in accordance with the predicted distributed parameters and system simulation is performed, the following data can be obtained, such as latest feasible input schedule $\hat{X}_I[p, k+1]$, latest feasible output schedule $\hat{Y}[p, k+1]$ and order-fill rate $\hat{V}[p, k+1]$. Hereinafter, the distributed-parameters estimation module 132, the distributed-parameters prediction module 134 and the PN simulation module 135 are explained.

Distributed-Parameters Estimation Module 132

The distributed-parameters estimation module 132 is used to estimate a plurality of sets of historical input distributed-parameters data $\theta_x[p, 1 \ldots k]$ and a plurality of sets of historical production distributed-parameters data $\theta_y[p, 1 \ldots k]$ by using the historical input schedules $X_I[p, 1 \ldots k]$ and the historical output schedules Y[p, 1 . . . k] in accordance with the distributed-parameters estimation method. The distributed-parameters estimation method is described as follows.

Since the cycle time CT collected by the system is WIP production time minus input time, and actually includes transport delay, waiting time WT and actual processing time PT, and thus CT=TD+WT+PT. For a typical product, TD meets an exponential distribution (Exponential($\lambda$)); PT also meets a normal distribution (Normal($\mu$, $\sigma$)) under stable production capability. Thus, the unknown waiting time WT can be obtaining by fitting the collected cycle time CT.

To identify distributed parameters of cascaded activities, this module adopts the following statistics to evaluate fit results:

1. the Kullback-Leibler Distance (KLD), which is used to determine the distance between two probabilistic models;
2. Kolmogorov-Smirnov (KS) test $D=\max|F_f(x)-F_e(x)|$, wherein $F_e(x)$ represents a cumulative probability of expected days, and $F_f(x)$ stands for a cumulative probability of fitted days, and D represents the maximum error between the fitted value and the expected value; and
3. F-test $$F = \frac{\sigma_f^2}{\sigma_e^2},$$

wherein $\sigma_f^2$ stands for an expected variance and $\sigma_e^2$ stands for a fitted variance, used for testing the confidence level of fitting a distributed variance and the expected variance.

Since different statistics represent different fit measurements, this module adopts KLD and KS-test optionally with F-test to fit cascaded activities and proposed a genetic algorithm such as a niche genetic programming (NGP) method to obtain a Pareto front set, which presents the optimal distributed parameters chromosomes, to form the optimal fit set. In each genetic generation, more than 30 niches provide feasible chromosomes, which are filtered to satisfy significance level a in the D statistic and sorted by a KLD-based fitness function, to mutate for generating next generation chromosomes. When acceptable conditions reached, the reserved chromosomes in each niche eventually form a Pareto front set. According to the law of large numbers, the derived Pareto set mean is normal or uniform distributed; such that, the set mean and variance can be used to represent actual processing time.

The utilization of the aforementioned KLD, F-test, KS-test, fitness function and genetic algorithm are well known to those who are skilled in the art, and are not described in detail herein.

Distributed-Parameters Prediction Module 134

After applying the identified process parameter $\theta_x[p, 1 \ldots k]$ and $\theta_y[p, 1 \ldots k]$ to a neural network method, the next period process parameter can be derived and used in the next period process simulation.

The distributed-parameters prediction module 134 is used for predicting a set of estimated input distributed-parameters data $\hat{\theta}_x[p, k+1]$, a set of estimated production distributed-parameters data $\hat{\theta}_y[p, k+1]$ of the next production cycle by using the historical input distributed-parameters data $\theta_x[p, 1 \ldots k]$, and the historical output distributed-parameters data $\theta_y[p, 1 \ldots k]$ in accordance with a neural network method. As to the neural network method, it is well known to those who are skilled in the art, and is not described in detail herein.

PN Simulation Module 135

In simulation, the VPCS uses the stochastic colored timed Petri-nets to synthesize a plant model PN[p, k+1], which is used to simulate stochastic and time behaviors of identified lots in processes. For instance, in FIG. 3

Figure 5A:
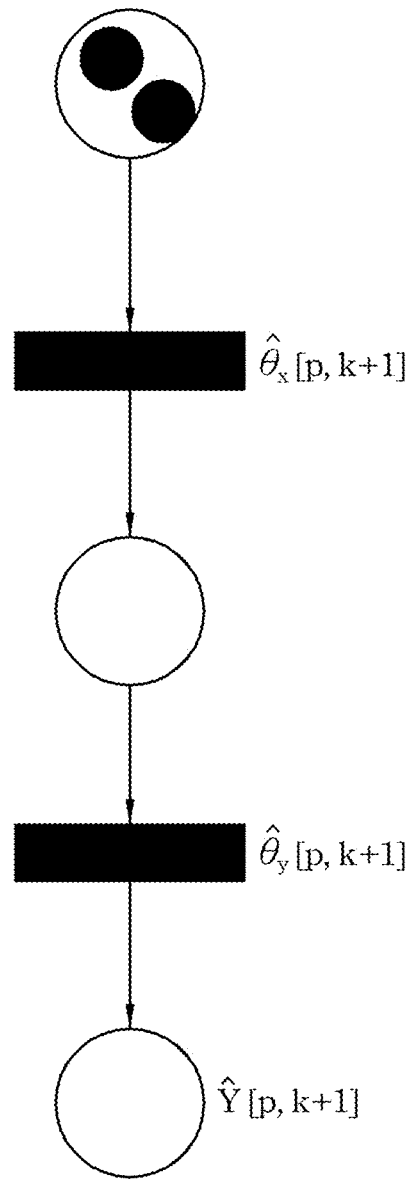
FIG. 5A is a schematic diagram used for explaining the Petri-Nets applied in the embodiment of the present invention.
Figure 5B:
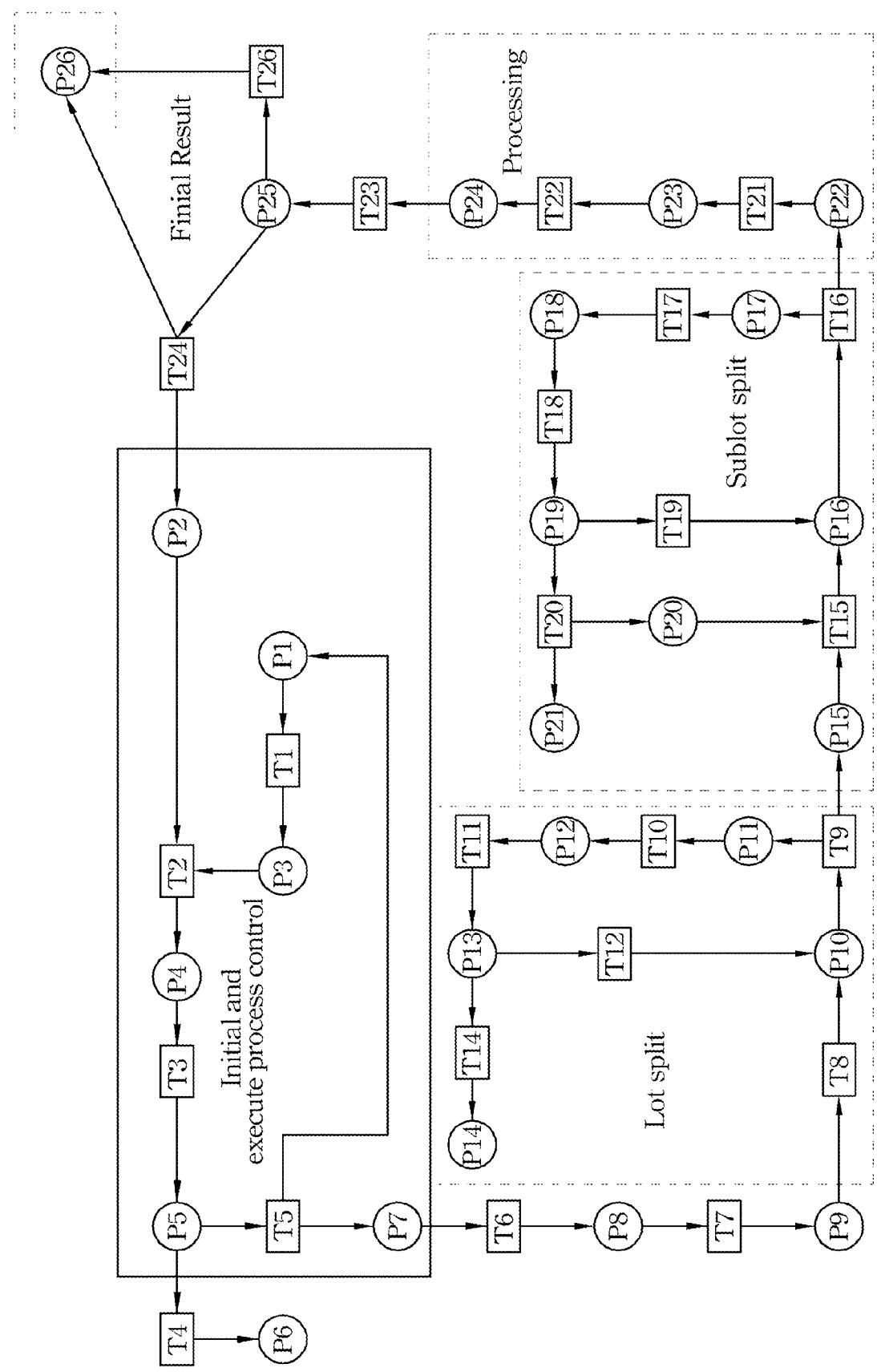
FIG. 5B is a schematic diagram showing the Petri-Nets of the embodiment of the present invention.

PN simulation module 135 uses Petri Nets, such as Stochastic Colored Timed Petri Nets, to build the features of process behaviors such as randomness and time delay. In the PN simulation module 135, at first, an appropriate PN skeleton 136 is selected in accordance with the production pattern and features, and then the latest ideal output schedule $\tilde{Y}[p, k+1]$, the estimated input distributed-parameters data $\hat{\theta}_x[p, k+1]$, the estimated output distributed-parameters data $\hat{\theta}_y[p, k+1]$ of the next production cycle are synthesized in the PN model 137 to construct simulation model data PN[p, k+1] of production process stages. Referring to FIG. 5A, FIG. 5A is a schematic diagram used for explaining the Petri Nets applied in the embodiment of the present invention, wherein hollow circles stand for possible states; solid circle stand for initial conditions transited between states; and solid squares stand for processing or delayed random times (represented by distributed parameters) required for transitions. By applying the method shown in FIG. 5A, the simulation model data PN[p, k+1] of the production process stages can be constructed as shown in FIG. 5B. FIG. 5B is a schematic diagram showing the Petri Nets of the embodiment of the present invention, wherein, a circle represents a place denoting a state of a token, i.e. a lot, a rectangle represents a transition denoting a state change condition, and an arc stands for a condition from a state to a transition or from a transition to a state. Additionally, $\hat{\theta}_x[p, k+1]$ and $\hat{\theta}_y[p, k+1]$ with the corresponding distributions are allocated at the arcs and the specific activities are defined in the actions of transitions to realize functions, e.g. lot splitting, merging and processing. Based on a plant model, the shipping plan P[p, k+1] is then simulated to estimate feasible inputs, outputs, and OFR.

Thereafter, the simulation model data PN[p, k+1] are inputted into the simulation output module 138 so as to obtain latest feasible input schedule $\hat{X}_f[p, k+1]$, latest feasible output schedule $\hat{Y}[p, k+1]$ The utilization of the aforementioned Petri Nets is well known to those who are skilled in the art, and are not described in detail herein.

Output Data

The purpose of the inventory profile 106 is to analyze the inventory distribution of the manufacturer side at the supplier side, thereby providing the manufacturer side with a reference for monitoring the WIP inventory level. The inventory profile 106 may forecast the possible problems of idle material and low turnover rate, so as to warn the manufacturer side that the inventory level has to be adjusted to lower inventory cost. The inventory profile 106 includes the most updated WIP production status and quantity, and estimated inventory turnover rate and idle material. In other words, the inventory profile 106 assists a manufacturer side to explore a supplier's inventory for monitoring and controlling inventory level. This profile, which includes updated production states and estimated TOR of material inventory, provides a manufacturer with obsolete material forecasts. Based on forecasts, a manufacturer can review and even modify demands before releasing to a supplier for reducing obsolete inventory.

The purpose of the delivery profile 108 is to provide the manufacturer side with a reference of the supplier side's delivery capability, so that the manufacturer side may send a feasible material requirements plan to the supplier side; and to estimate the order-fill rate (OFR) $\hat{V}[p, k+1]$ of the shipping plan promised by the supplier side, so that the production risks can be found out and resolved early. The delivery profile 108 includes estimated production date and quantity, an estimated order-fill rate, an estimated delayed delivery quantity, delayed delivery reasons and production capacity bottlenecks. In other words, the delivery profile 108 shows OFRs which are estimated according to a shipping plan confirmed by a supplier side, that presents potential production risks, such as production bottleneck and starvation for negotiation with supplier to find problem solutions. To explore potential problems, this profile provides estimated input $\hat{X}_f[p, k+1]$, estimated output $\tilde{Y}[p, k+1]$, estimated OFR $\hat{V}[p, k+1]$, estimated tardy quantity, reason for tardiness, and capacity bottleneck.

It is understood that a virtual production control method of the present invention includes the implementation steps of the respective modules described above, and a computer program product of the present invention for virtual production control is used to perform the virtual production control method when executed.

Hereinafter, a simplified application example is used to further explain the VPCS and virtual production control method according to the embodiments of the present invention.

Please refer to FIG. 3 and FIG. 4.

Let say that the manufacturer side sends a material requirements plan D[p, k+1] (as shown in Table 1) to the supplier side on November 30, and asks the supplier side to deliver the products on December 8 and December 10. After evaluating its production capability, the supplier side replies to the manufacturer side with the shipping plan 102, and starts sending the WIP information 104 (production status) before November 30 to the manufacturer side. After loading the shipping plan 102 and the WIP information 104 into the aforementioned VPCS 100, the manufacturer side forecasts that the supplier side may fail to achieve the delivery of December 8, and the reasons for failing to achieve the delivery is due to no input and insufficient production capacity, and thus the supplier side is promptly notified to release the lot and prepare more production capacity. The procedures for performing the virtual production control method with the VPCS are described as follows.

At first, the manufacturer side send the material requirements plan D[p, k+1] (as shown in Table 1) regarding two products to the supplier side on November 30, and then the supplier side replies to the manufacturer side with the shipping plan P[p, k+1](i) (as shown in Table 2, where i is the ith day at period k+1.); and sends the WIP information 104 on November 30 to the manufacturer side, the WIP information 104 including the historical input data $X_I[p, k]$ (i.e. initial WIP $w_p^0$) (as shown in Table 3) of the most recent production cycle k (November 30).

TABLE 1

Material Requirements Plan

| Product p | Product group g | 12/8 | 12/10 |
|---|---|---|---|
| p = 1 | g = 1 | D[1, k + 1](1) = 120 | D[1, k + 1](2) = 80 |
| p = 2 | g = 2 | D[2, k + 1](1) = 50 | D[2, k + 1](2) = 90 |

TABLE 2

Shipping plan

| Product p | Product group g | 12/8 | 12/10 |
|---|---|---|---|
| p = 1 | g = 1 | P[1, k + 1](1) = 120 | P[1, k + 1](2) = 80 |
| p = 2 | g = 2 | P[2, k + 1](1) = 50 | P[2, k + 1](2) = 90 |

TABLE 3

Historical Input Data of Production Cycle k

| Product p | 11/30 |
|---|---|
| p = 1 | $X_I[1, k] = 20$ |
| p = 2 | $X_I[2, k] = 0$ |

By using the VPCS, the manufacturer loads the initial WIP and the shipping plan and finds that the supplier may fail to fill the order on December 8. According to the delivery profile, this failure can be attributed to a delayed input and insufficient capacity. The detailed procedures in using the VPCS are described as follows.

The data preprocessing module 110 analyze the shipping plan 102 and the historical WIP information 104 to obtain production parameters including historical input schedules $X_I[p, 1 \ldots k]$ (as shown in Table 4), historical output schedules Y[p, 1 \ldots k] (as shown in Table 5), an expected production capacity limit U[g, k+1] (as shown in Table 6), an loss rate e[g, k] (as shown in Table 7), and an inventory turnover rate r=65%.

TABLE 4

Historical Input Schedules

| Product p | 1 | ... | k |
|---|---|---|---|
| p = 1 | 30 | ... | 20 |
| P = 2 | 20 | ... | 0 |

TABLE 5

Historical Output schedules

| Product p | 1 | ... | k |
|---|---|---|---|
| p = 1 | 0 | ... | 0 |
| P = 2 | 10 | ... | 0 |

TABLE 6

Expected Production Capacity Limits

| Production Group G | 12/1~12/10 |
|---|---|
| g = 1 | U[1, k + 1] = 90 |
| g = 2 | U[2, k + 1] = 100 |

TABLE 6

Loss Rates

| Product p | Loss Rate |
|---|---|
| p = 1 | e[1, k] = 5% |
| p = 2 | e[2, k] = 3% |

Then, the WIP monitoring module 120 uses $X_I[p, 1 \ldots k]$ and P[p, k+1] to perform an integer programming (IP) so as to obtain the latest ideal input schedule $\hat{X}_I[p, k+1]$ (as shown in Table 8) and the latest ideal output schedule $\hat{Y}[p, k+1]$ (as shown in Table 9).

TABLE 8

Latest Ideal Input Schedule

| Product p | 12/8 | 12/10 |
|---|---|---|
| p = 1 | $\hat{X}_I[1, k + 1](1) = 90$ | $\hat{X}_I[1, k + 1](2) = 84$ |
| p = 2 | $\hat{X}_I[2, k + 1](1) = 90$ | $\hat{X}_I[2, k + 1](2) = 50$ |

TABLE 9

Latest Ideal Output schedule

| Product p | 12/8 | 12/10 |
|---|---|---|
| p = 1 | $\hat{Y}[1, k + 1](1) = 86$ | $\hat{Y}[1, k + 1](2) = 80$ |
| p = 2 | $\hat{Y}[2, k + 1](1) = 87$ | $\hat{Y}[2, k + 1](2) = 49$ |

Thereafter, the distributed-parameters estimation module 132 bases on the historical input schedules $X_I[p, 1 \ldots k]$ and the historical output schedules Y[p, 1 \ldots k] to express the historical input and production behaviors in statistic distributions, and used a genetic algorithm and statistic tests (such as a F-test and a KS-test) to fit the assumed values and the actual values, thereby obtaining a plurality of sets of historical input distributed-parameters $\theta_x[p, 1 \ldots k]$ (as shown in Table 10) and a plurality of sets of historical output distributed-parameters $\theta_y[p, 1 \ldots k]$ (as shown in Table 11) by using the distribution parameters of the historical data if the errors between the assumed values and the actual values are minimum.

TABLE 10

Historical Input Distributed-parameters

| Product p | 1 | ... | k |
|---|---|---|---|
| p = 1 | $\theta_x[1, 1]$ = (0.23, 0.43) | ... | $\theta_x[1, k]$ = (0.25, 0.51) |
| p = 2 | $\theta_x[2, 1]$ = (0.12, 1.46) | ... | $\theta_x[2, k]$ = (0.13, 1.79) |

TABLE 11

Historical Output Distributed-parameters

| Product p | 1 | ... | k |
|---|---|---|---|
| p = 1 | $\theta_y[1, 1]$ = (2.45, 0.56) | ... | $\theta_y[1, k]$ = (2.25, 0.34) |
| p = 2 | $\theta_y[2, 1]$ = (8.9, 1.46) | ... | $\theta_y[2, k]$ = (9.1, 1.79) |

Thereafter, the distributed-parameters prediction module 134 bases on the historical input distributed-parameters $\theta_x[p, 1 \ldots k]$ and the historical output distributed-parameters $\theta_y[p, 1 \ldots k]$, and used the distributed-parameters of the next production cycle k+1 conjectured by the neural network method to obtain the estimated input distributed-parameters $\hat{\theta}_x[p, k+1]$, the estimated output distributed-parameters $\hat{\theta}_y[p, k+1]$ (as shown in Table 12).

TABLE 12

Estimated Input and Output Distributed-parameters

| Product p | Input Distributed-parameters | Production Distributed-parameters |
|---|---|---|
| p = 1 | $\hat{\theta}_x[1, k + 1]$ = (0.35, 0.56) | $\hat{\theta}_y[1, k + 1]$ = (2.15, 0.35) |
| p = 2 | $\hat{\theta}_x[2, k + 1]$ = (0.15, 1.56) | $\hat{\theta}_y[2, k + 1]$ = (8.98, 1.81) |

Then, in the PN simulation module 135, after the aforementioned $\hat{Y}[p, k+1]$, $\hat{\theta}_x[p, k+1]$ and $\hat{\theta}_y[p, k+1]$ are combined in a PB model 137, the simulation model data PN[p, k+1] of the production process stages can be constructed as shown in FIG. 5B. Thereafter, the simulation model data PN[p, k+1] are inputted into the simulation output module 138 so as to obtain latest feasible input schedule $\hat{X}_I[p, k+1]$ (as shown in Table 13), latest feasible output schedule $\hat{Y}[p, k+1]$ (as shown in Table 14) and the order-fill rate $\tilde{V}[p, k+1]$ (as shown in Table 15).

TABLE 13

Latest Feasible Input Schedule

| Product p | 11/28 | 12/1 | 12/3 |
|---|---|---|---|
| p = 1 | $\hat{X}_I[1, k + 1](1)$ = 90 | 0 | $\hat{X}_I[1, k + 1](2)$ = 84 |
| p = 2 | 0 | $\hat{X}_I[2, k + 1](1)$ = 90 | $\hat{X}_I[2, k + 1](2)$ = 50 |

TABLE 14

Latest Feasible Output schedule

| Product p | 12/8 | 12/10 |
|---|---|---|
| p = 1 | $\hat{Y}[1, k + 1](1)$ = 86 | $\hat{Y}[1, k + 1](2)$ = 80 |
| p = 2 | $\hat{Y}[2, k + 1](1)$ = 87 | $\hat{Y}[2, k + 1](2)$ = 49 |

TABLE 15

Order-fill Rate

| Product p | 12/8 | 12/10 |
|---|---|---|
| p = 1 | $\tilde{V}[1, k + 1](1)$ = 88% (=(86 + 20)/120) | $\tilde{V}[1, k + 1](2)$ = 100% (=80/80) |
| p = 2 | $\tilde{V}[2, k + 1](1)$ = 100% (=50/50) | $\tilde{V}[2, k + 1](2)$ = 95% = (87 − 50 + 49)/90) |

Accordingly, the items failing to achieve 100% order-fill rate are $\tilde{V}[1, k+1](1)$=88% and $\tilde{V}[2, k+1](2)$=95%, and the reasons for failing to achieve 100% order-fill rate are analyzed as follows.

$\tilde{V}[1,k+1](1)$=88%:   1

As the sum of capacity U[1, k+1]=90 and initial WIP $w_1^0$=20 are less than the shipping plan P[1, k+1](1)=120, supplier capacity is insufficient, and the additional capacity for the supplier is 11 (=(120−90−20)/(1-5%)).

$\tilde{V}[2,k+1](2)$=95%:   2

The capacity U[2, k+1]=100 is sufficient for the shipping plan P[2,k+1] (1)=90. However, according to the feasible input $\hat{X}_I[2, k+1](2)$=50, total input plus production loss is $\hat{X}_I[2, k+1](1)+\hat{X}_I[2, k+1](2))\times(1-e[2,k])$=136, which is less than the accumulating shipping plan of product 2 P[2,k+1](1)+P[2,k+1](2)=140 by 2 days. Hence, the input must be added 4 (=(140−136)/(1-3%)) parts in the period k+1.

Besides, although feasible input time $\hat{X}_{I\!T}[1, k+1](1)$=90 was on November 28, the current time was assumed November 30, implying that the supplier could not produce product 1 within a normal cycle time derived from history. Hence, to fulfill the order, the manufacturer should request that the supplier prioritize production to shorten the needed processing time for producing product 1.

To sum up, the application the embodiments of the present invention can effectively conjecture the delivery capability of the supplier side, thereby adjusting and controlling the inventory level at the supplier side, thus ensuring the supplier side to achieve high order-fill rate and high inventory turnover rate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A virtual production control method for effectively conjecturing delivery capability of a real factory at a supplier side, the virtual production control method comprising:

processing a current shipping plan and a plurality of sets of historical WIP (Work-In-Process) data respectively belonging to a plurality of historical production cycles sent from the supplier side, thereby obtaining a plurality of historical input schedules and a plurality of historical output schedules belonging to said historical production cycles, an expected production capacity limit of a next production cycle following said historical production cycles, and an loss rate of the most recent one of said historical production cycles;

performing an integer programming method by a computer using said current shipping plan and one of said historical input schedules belonging to the most recent one of said historical production cycles, to compute a latest ideal input schedule and a latest ideal output schedule belonging to said next production cycle; and simulating and obtaining a latest feasible input schedule and a latest feasible output schedule belonging to said next production cycle by using said historical input schedules, said historical output schedules, and said latest ideal output schedule belonging to said next production cycle in accordance with a distributed-parameters estimation method, a neural network method and Petri Nets.

2. The virtual production control method as claimed in claim 1, further comprising:

generating an inventory profile in accordance with said expected production capacity limit, said loss rate, said latest feasible input schedule, said latest feasible output schedule and said current shipping plan, said inventory profile comprising the most updated production status and WIP quantity, and estimated inventory turnover rate and idle material.

3. The virtual production control method as claimed in claim 1, further comprising:

generating a delivery profile in accordance with said expected production capacity limit, said loss rate, said latest feasible output schedule and said current shipping plan, said delivery profile comprising estimated production date and quantity, an estimated order-fill rate, an estimated delayed delivery quantity, delayed delivery reasons and production capacity bottlenecks.

4. The virtual production control method as claimed in claim 1, further comprising:

said integer programming uses a delivery method achieving a maximum order-fill rate as an objective to conjecture a output schedule and a input schedule, and is limited by an actual production capacity of said supplier side, and is restricted by a safe inventory strategy of said supplier side.

5. The virtual production control system as claimed in claim 1, further comprising:

conjecturing a plurality of sets of historical input distributed-parameters data, a plurality of sets of historical output distributed-parameters data by using said historical input schedules and said historical output schedules in accordance with said distributed-parameters estimation method;

predicting a set of estimated input distributed-parameters data, a set of estimated output distributed-parameters data of said next production cycle by using said sets of historical input distributed-parameters data, and said sets of historical output distributed-parameters data in accordance with said neural network method; and simulating and obtaining said latest feasible input schedule and said latest feasible output schedule belonging to said next production cycle by using said latest ideal output schedule, said set of estimated input distributed-parameters data, said set of estimated output distributed-parameters data belonging to said next production cycle in accordance with said Petri Nets.

6. The virtual production control method as claimed in claim 5, wherein said distributed-parameters estimation method comprises:

a Kolmogorov-Smirnov test used for testing the maximum absolute error between a fitted value and an expected value; and a genetic algorithm used for combining said F-test and said Kolmogorov-Smirnov test.

7. The virtual production control method as claimed in claim 1, further comprising:

providing a material requirements plan by said manufacturer side to said supplier side; and fabricating said current shipping plan by said supplier side in accordance with said material requirements plan.

8. A computer program product stored on a non-transitory tangible computer readable recording medium, which, when executed, performs a virtual production control method for effectively conjecturing delivery capability of a real factory at a supplier side, the virtual production control method comprising:

processing a current shipping plan and a plurality of sets of historical WIP information respectively belonging to a plurality of historical production cycles sent from a supplier side, thereby obtaining a plurality of historical input schedules and a plurality of historical output schedules belonging to said historical production cycles, an expected production capacity limit of a next production cycle following said historical production cycles, and an loss rate of the most recent one of said historical production cycles;

performing an integer programming by using said current shipping plan and one of said historical input schedules belonging to the most recent one of said historical production cycles, thereby computing a latest ideal input schedule and a latest ideal output schedule belonging to said next production cycle; and simulating and obtaining a latest feasible input schedule and a latest feasible output schedule belonging to said next production cycle by using said historical input schedules, said historical output schedules, and said latest ideal output schedule belonging to said next production cycle in accordance with a distributed-parameters estimation method, a neural network method and Petri Nets.

9. The computer program product as claimed in claim 8, wherein the method further comprises:

conjecturing a plurality of sets of historical input distributed-parameters data, a plurality of sets of historical output distributed-parameters data by using said historical input schedules and said historical output schedules in accordance with said distributed-parameters estimation method;

predicting a set of estimated input distributed-parameters data, a set of estimated output distributed-parameters data of said next production cycle by using said sets of historical input distributed-parameters data, and said sets of historical output distributed-parameters data in accordance with said neural network method; and simulating said latest feasible input schedule and said latest feasible output schedule belonging to said next production cycle by using said latest ideal output schedule, said set of estimated input distributed-parameters data, said set of estimated output distributed-parameters data belonging to said next production cycle in accordance with said Petri Nets.

10. The computer program product as claimed in claim 8, wherein said distributed-parameters estimation method comprises:

a Kullback-Leibler Distance used for determining a distance between two probabilistic models;

a Kolmogorov-Smirnov test used for testing the maximum absolute error between a fitted value and an expected value; and a genetic algorithm used for combining said F-test and said Kolmogorov-Smirnov test.

* * * * *